(12) United States Patent
Kojima et al.

(10) Patent No.: US 10,295,049 B2
(45) Date of Patent: May 21, 2019

(54) CONTROL APPARATUS FOR AUTOMATIC TRANSMISSION

(71) Applicant: Honda Motor Co., Ltd., Tokyo (JP)

(72) Inventors: Michio Kojima, Wako (JP); Yuichiro Takemori, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 258 days.

(21) Appl. No.: 15/507,182

(22) PCT Filed: Aug. 28, 2015

(86) PCT No.: PCT/JP2015/074441
§ 371 (c)(1),
(2) Date: Feb. 27, 2017

(87) PCT Pub. No.: WO2016/035711
PCT Pub. Date: Mar. 10, 2016

(65) Prior Publication Data
US 2017/0284537 A1   Oct. 5, 2017

(30) Foreign Application Priority Data

Sep. 1, 2014  (JP) ................. 2014-177216

(51) Int. Cl.
*F16H 61/02* (2006.01)
*F16H 59/02* (2006.01)
*F16H 59/58* (2006.01)

(52) U.S. Cl.
CPC ......... *F16H 61/02* (2013.01); *F16H 59/0204* (2013.01); *F16H 61/0204* (2013.01); *F16H 59/58* (2013.01); *F16H 2059/0221* (2013.01); *F16H 2059/0239* (2013.01); *F16H 2059/0247* (2013.01); *F16H 2302/04* (2013.01)

(58) Field of Classification Search
CPC .. F16H 61/02; F16H 59/0204; F16H 61/0204; F16H 2302/04; F16H 2059/0247; F16H 2059/0221; F16H 2059/0239; F16H 59/58
See application file for complete search history.

(56) References Cited

U.S. PATENT DOCUMENTS 7,597,021 B2 * 10/2009 Nishio ................ F16H 59/0204
74/473.12
2003/0101840 A1 * 6/2003 Yoshikawa ............ B60K 20/06
74/552

FOREIGN PATENT DOCUMENTS

| EP | 0681119 A2 | 11/1995 |
| JP | H07301321 A | 11/1995 |
| JP | 2006046553 A | 2/2006 |

(Continued)

*Primary Examiner* — Ramya P Burgess
*Assistant Examiner* — Lillian T Nguyen
(74) *Attorney, Agent, or Firm* — Duft & Bornsen, PC

(57) ABSTRACT

An apparatus for controlling automatic transmission includes: an automatic gear-shift mode for automatically selecting a gear position based on a driving condition of a vehicle; and a manual gear-shift mode for selecting the gear position based on an output of an up-shift instructing unit or a down-shift instructing unit, and sets a predetermined time period for maintaining the manual gear-shift mode when the up-shift instructing unit is operated, to be shorter than the predetermined time period when the down-shift instructing unit is operated, when the gear position is at or higher than a predetermined gear position.

6 Claims, 5 Drawing Sheets

(56) References Cited

FOREIGN PATENT DOCUMENTS

| | | | |
|---|---|---|---|
| JP | 2007132383 | A | 5/2007 |
| JP | 2007132385 | A | 5/2007 |
| JP | 2009299761 | A | 12/2009 |
| JP | 4417320 | B2 | 2/2010 |
| JP | 2010242944 | A | 10/2010 |
| WO | 2013027294 | A1 | 2/2013 |

* cited by examiner

CONTROL APPARATUS FOR AUTOMATIC TRANSMISSION

CROSS-REFERENCE TO RELATED APPLICATION

This application is a National Stage of PCT international application Ser. No. PCT/JP2015/074441 filed on Aug. 28, 2015 which designates the United States, incorporated herein by reference, and which is based upon and claims the benefit of priority from Japanese Patent Application No. 2014-177216, filed on Sep. 1, 2014, the entire contents of which are incorporated herein by reference.

TECHNICAL FIELD

This invention relates to a control apparatus for an automatic transmission, specifically to a control apparatus for an automatic transmission having an automatic gear-shift mode and a manual gear-shift mode.

BACKGROUND ART

Although gear-shift control is ordinarily implemented in response to driving condition in a vehicle equipped with an automatic transmission, freedom of gear shifting is narrow because the control is performed based on a gear-shift map defined in advance. Automatic transmissions that have a manual gear-shift mode in addition to an automatic gear-shift mode have therefore been proposed that enable implementation of gear-shift control reflecting the intention of the driver.

For example, the technology of Patent Literature 1 is configured to include a lever (paddle) for outputting an up-shift command or down-shift command in response to driver operation, thereby enabling sequential shifting matched to the intention of the driver among automatic transmission gear positions on both the high-speed side and low-speed side.

CITATION LIST

Patent Literature

Patent Literature 1: Japanese Patent No. 4417320

DISCLOSURE OF INVENTION

Problems to be Solved by the Invention

In the technology proposed in Patent Literature 1, discrimination of vehicle cruising is performed after manual gear-shift mode has been maintained for a prescribed time period, and when cruising is found to be in effect, the mode is switched (returned) to automatic gear-shift mode.

As the prescribed time period for which manual gear-shift mode is maintained, the technology of Patent Literature 1 indiscriminately uses a fixed value with no consideration to vehicle driving condition or similar factors. However, in order to provide a more convenient automatic transmission, the circumstances under which manual gear-shift mode is actually used should be deduced and the decision regarding return to automatic gear-shift mode made taking the result into account.

Therefore, an object of the present invention is to overcome the aforesaid issue by providing a control apparatus for an automatic transmission having an automatic gear-shift mode and a manual gear-shift mode, which apparatus offers outstanding convenience by deciding return from manual gear-shift mode to automatic gear-shift mode taking deduced circumstances into consideration.

Means for Solving Problem

According to an aspect of the present invention, an apparatus for controlling an automatic transmission configured to change speed of driving rotation of a power source mounted on a vehicle and transmit the speed of driving rotation to an output shaft of the transmission, includes: an up-shift instructing unit configured to be operated by a driver of the vehicle to output an up-shift command for a gear position of the transmission; a down-shift instructing unit separated from the up-shift instructing unit and configured to be operated by the driver to output a down-shift command for the gear position of the transmission; a mode switching unit configured to switch a gear-shift mode between an automatic gear-shift mode for automatically selecting the gear position based on a driving condition of the vehicle and a manual gear-shift mode for selecting the gear position based on an output of the up-shift instructing unit or the down-shift instructing unit; and a mode maintaining unit configured to maintain the manual gear-shift mode for a predetermined time period when the up-shift instructing unit or the down-shift instructing unit is operated by the driver, wherein the mode maintaining unit sets the predetermined time period when the up-shift instructing unit is operated, to be shorter than the predetermined time period when the down-shift instructing unit is operated, when the gear position is at or higher than a predetermined gear position, and the mode maintaining unit sets the predetermined time period when the gear position is at or higher than a second gear position higher than the first gear position, to be equal to or shorter than the predetermined time period when the gear position is at or higher than the first gear position and lower than the second gear position.

According to another aspect of the present invention, the mode maintaining unit sets the predetermined time period when the gear position is lower than the first gear position, to be equal to or shorter than the predetermined time period when the gear position is at or higher than the first gear position.

According to another aspect of the present invention, the mode maintaining unit changes the predetermined time period to be equal to or shorter than the predetermined time period set when the up-shift instructing unit or the down-shift instructing unit is operated by the driver for the first time in the manual gear-shift mode, when operation of the up-shift instructing unit or the down-shift instructing unit is repeated by the driver.

According to another aspect of the present invention, further includes: a steering angle detecting unit configured to detect a steering angle of a steering wheel operated by the driver, wherein the mode maintaining unit stops counting of the predetermined time period while the steering angle detected by the steering angle detecting unit is equal to or greater than a predetermined value.

According to another aspect of the present invention, the up-shift instructing unit and the down-shift instructing unit is provided on a back surface of a steering wheel operated by the driver.

Effect of the Invention

According to the present invention, return to automatic gear-shift mode can be decided in accordance with manual shifting intention of the driver deduced from the circumstances, thereby enhancing convenience of the automatic transmission.

DESCRIPTION OF EMBODIMENT

A control apparatus for an automatic transmission according to an exemplary embodiment of the present invention will be described with reference to the accompanying drawings hereinafter.

Embodiment

Figure 1:
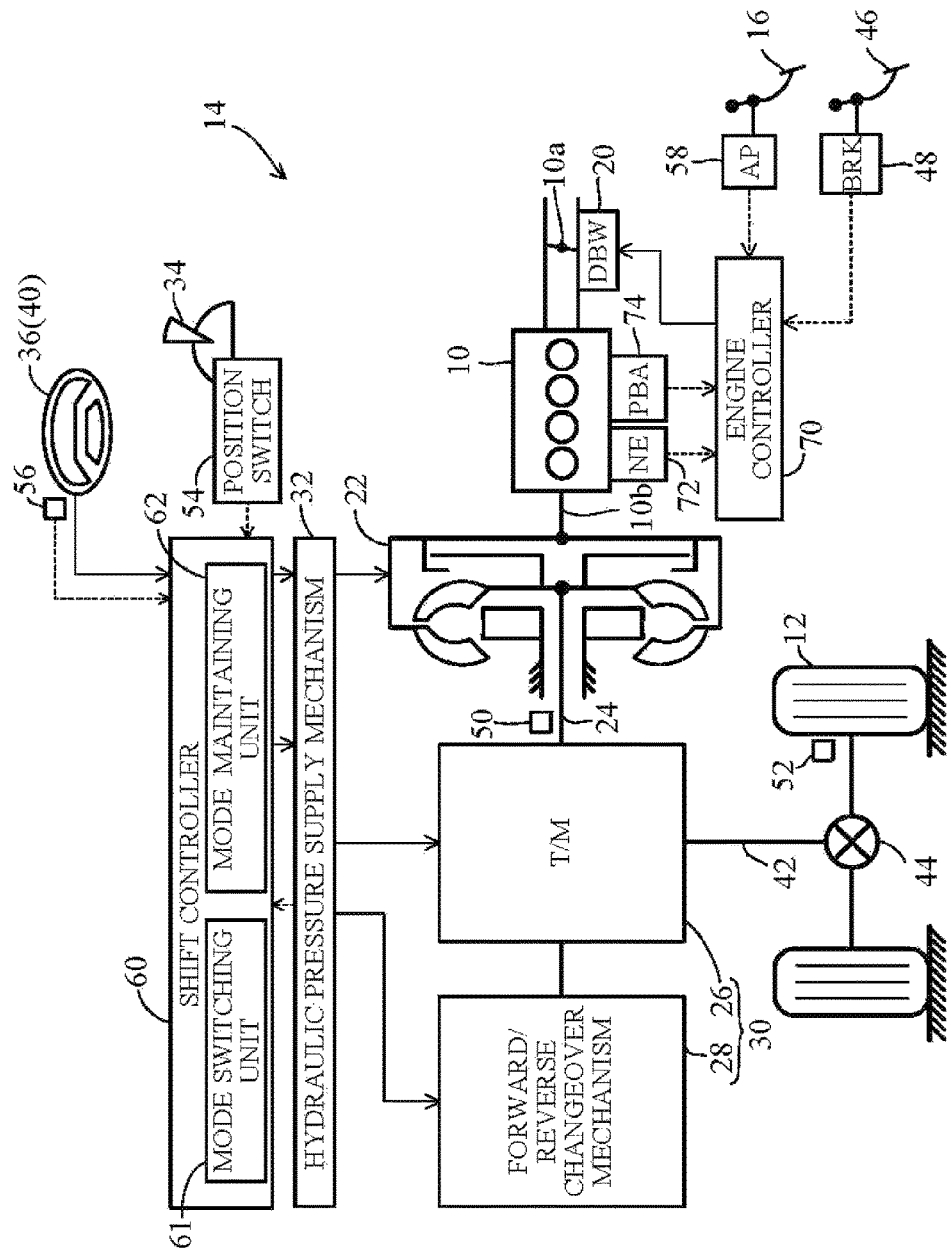
FIG. 1 is a schematic diagram generally illustrating a control apparatus for an automatic transmission according to an embodiment of this invention.
Figure 2A:
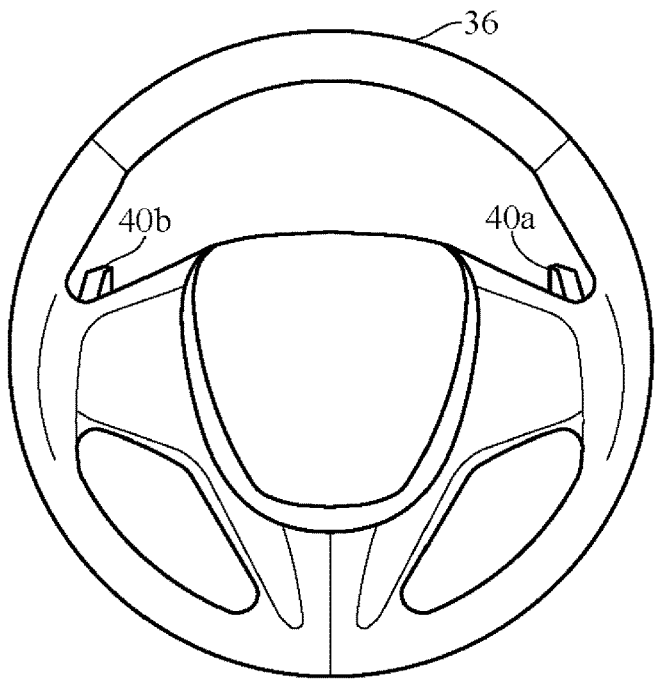
FIG. 2A is a front side explanatory diagram showing a structure of a steering wheel depicted in FIG. 1.
Figure 2B:
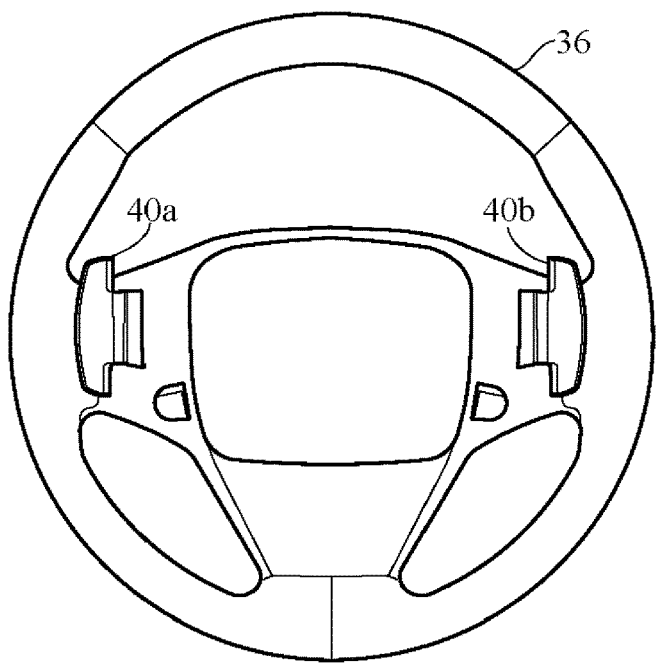
FIG. 2B is a back side explanatory diagram similarly showing a structure of a steering wheel depicted in FIG. 1.

FIG. 1 is a schematic diagram generally illustrating a control apparatus for an automatic transmission according to an embodiment of this invention, and FIGS. 2A and 2B are explanatory diagrams concretely showing a structure of a steering wheel depicted in FIG. 1.

Reference numeral 10 in FIG. 1 designates an engine (power source). The engine 10 is a gasoline-fueled, internal combustion engine that is installed in a vehicle 14 equipped with drive wheels (vehicle wheels) 12 (the vehicle 14 is depicted partially by representative components including the engine 10 and drive wheels 12).

A throttle valve 10a installed in an air-intake system of the engine 10 is mechanically disconnected from an accelerator pedal 16 installed on a floor at a vehicle driver's seat and is connected to and opened/closed by a DBW (Drive By Wire) mechanism 20 comprising an electric motor or other actuator.

Rotation of the engine 10 is transmitted through an output shaft 10b connected to a crankshaft and input to a torque converter 22 and further input from the torque converter 22 through a transmission input shaft 24 to a shift mechanism 26. The shift mechanism 26 is connected to a forward/reverse changeover mechanism 28. In this specification, the shift mechanism 26 and forward/reverse changeover mechanism 28 are in combination called an automatic transmission 30.

The operation of the automatic transmission 30 is controlled by a hydraulic pressure supply mechanism 32. The hydraulic pressure supply mechanism 32 supplies hydraulic pressure to a lock-up clutch of the torque converter 22, the CVT 26, and a clutch of the forward/reverse changeover mechanism 28. Roughly described, the hydraulic pressure supply mechanism 32 is equipped with, inter alia, a hydraulic (oil feeding) pump driven by the engine 10 to pump hydraulic oil from a reservoir and deliver it to oil passages, and a group of electromagnetic solenoid valves interposed in the oil passages.

At the vehicle driver's seat are provided so as to be operable by the driver a select lever 34 including P, R, N, D and S ranges, for example, and a steering wheel 36. The steering wheel 36 is equipped with a paddle shifter 40 by which the driver can manually instruct up-shift/down-shift, i.e., output an up-shift/down-shift command.

More specifically, as illustrated in FIGS. 2A and 2B, an up-shift switch 40a and a down-shift switch 40b are provided at right side and left side locations on the back surface of the steering wheel 36 so as to be operable by the driver. In this embodiment, the up-shift switch 40a and down-shift switch 40b are constituted as separate components and provided on the back surface of the steering wheel 36 to be spaced apart laterally. FIG. 2A is a front side view (view from the driver's side) of the steering wheel 36, and FIG. 2B is a back side view (view from the vehicle front side) of the steering wheel 36.

When after putting the select lever 34 in D range, the driver operates either the up-shift switch 40a or the down-shift switch 40b, the vehicle 14 enters manual gear-shift mode (D range paddle shift mode). In this manual gear-shift mode, gear position shifts up one speed with each operation of the up-shift switch 40a and gear position shifts down one speed with each operation of the down-shift switch 40b, whereby gear-shift control resembling that of a manual transmission can be implemented in the automatic transmission.

Moreover, also in a case where after putting the select lever 34 in S range, the driver operates the up-shift switch 40a or the down-shift switch 40b, the vehicle 14 enters manual gear-shift mode (S range paddle shift mode), but the following explanation of this embodiment of the invention is focused primarily on the case of D range paddle shift mode. While gear-shift control using the paddle shifter 40 is in principle implemented in line with the driver's gear-shift intention, gear-shift is of course prohibited in cases where there is a risk of engine stalling or engine overspeed.

Further, in this embodiment of the invention, since the paddle shifter 40 (specifically, the up-shift switch 40a and the down-shift switch 40b) is deployed as shown in FIG. 2A, FIG. 2B, the driver can easily operate the steering wheel 36 and operate the paddle shifter 40 simultaneously. On the downside, however, a danger of the paddle shifter 40 being erroneously operated is also present, such as when the driver grasps the steering wheel 36 at a different position. Therefore, this embodiment is adapted to minimize unpleasant feel experienced by the driver by additionally deducing probable cases of driver erroneous operation of the paddle shifter 40.

Returning to explanation with reference to FIG. 1, when P or N range is selected using the select lever 34, a forward clutch and a reverse brake-clutch are disengaged, thereby cutting of transmission of motive power through the forward/reverse changeover mechanism 28. Further, rotation (rotary drive force) of the engine 10 speed-regulated by the shift mechanism 26 is transmitted to the drive wheels 12 through a transmission output shaft (output shaft) 42 and a differential mechanism 44.

A brake pedal 46 is deployed on the floor at the vehicle driver's seat to be operable by the driver. When the driver operates the brake pedal 46, a brake switch 48 outputs an ON signal.

An NT sensor (rotational speed sensor) 50 installed near the transmission input shaft 24 utilizes rotational speed of a turbine-runner of the torque converter 22 to output a pulse signal indicating the rotational speed of the transmission input shaft 24.

Wheel speed sensors 52 installed one near each drive wheel 12 utilize rotational speeds of the wheels to output pulse signals proportional to the vehicle speed (travel speed of the vehicle 14), and a position switch 54 installed near the select lever 34 outputs a signal corresponding to the range P, R, N, D or the like selected (discrete speed shift commands input) by the driver.

Further, a steering angle sensor 56 installed near the steering wheel 36 produces an output proportional to steering amount (steering angle) of the steering wheel 36 by the driver, and an accelerator position sensor 58 installed near the accelerator pedal 16 produces an output corresponding to accelerator position AP corresponding to depression of the accelerator pedal 16 by the driver.

Outputs of the aforesaid up-shift switch 40a and the like are sent to a shift controller 60. The shift controller 60 comprises an electronic control unit equipped with a microcomputer including a CPU, ROM, RAM, I/O and other components. The shift controller 60 includes, as functional components, a mode switching unit 61 and a mode maintaining unit 62. The shift controller 60 corresponds to the control apparatus for an automatic transmission in this invention.

In addition, an engine controller 70, also comprising an electronic control unit, is provided for controlling the operation of the engine 10. The engine controller 70, which is equipped with a crank angle sensor 72 that produces an output indicating rotational speed NE of the engine 10, an absolute pressure sensor 74 that produces an output indicating load PBA of the engine 10 and other sensors not shown in the drawings, is configured to communicate with the shift controller 60.

The shift controller 60 uses the accelerator position AP detected from the accelerator position sensor 58 and the vehicle speed detected from the output of the wheel speed sensors 52 to select a desired gear position in accordance with predefined characteristics (a shift map) and regulates hydraulic pressure supplied from the hydraulic pressure supply mechanism 32 to establish the desired gear position.

Further, the engine controller 70 uses the accelerator position AP detected from the output of the accelerator position sensor 58 and the engine rotational speed NE detected from the crank angle sensor 72 to calculate a fuel injection quantity (and ignition timing) in accordance with predefined characteristics, uses the detected accelerator position AP to calculate a throttle opening of the DBW mechanism 20 in accordance with predefined characteristics, and controls the operation of the actuator of the DBW mechanism 20 accordingly.

Figure 3:
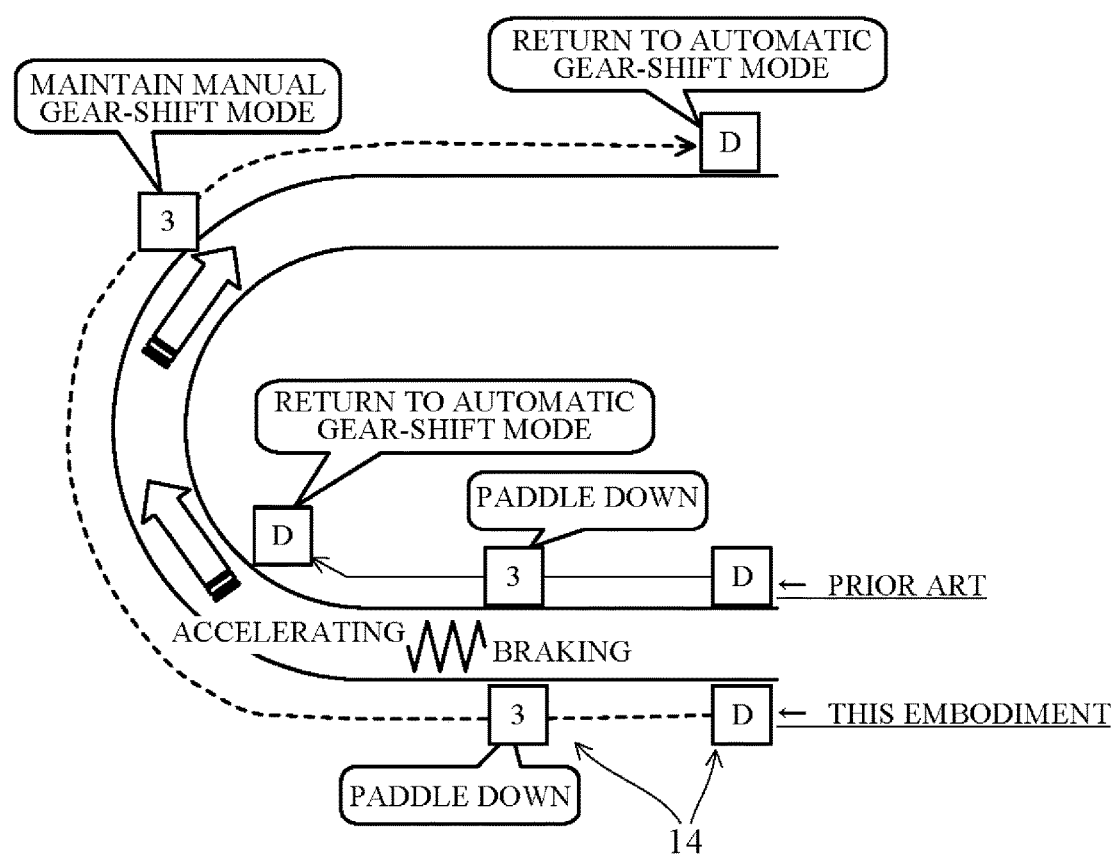
FIG. 3 is an explanatory diagram showing overview of operation of the control apparatus for the automatic transmission shown in FIG. 1.

Now follows an overview of the operation of the shift controller 60 according this embodiment with reference to FIG. 3.

In the prior art, as pointed out earlier, at the time of returning from manual gear-shift mode to automatic gear-shift mode, the time period (prescribed time period) during which manual gear-shift mode is maintained prior to discrimination of cruising is always set at a fixed value irrespective of the driving condition of the vehicle 14 and other factors.

However, cases in which a paddle shifter 40 is operated to switch to a manual gear-shift mode (D range paddle shift mode) during D-range driving can be expected to be cases of implementing down-shift by operating the down-shift switch 40b in order to, for example, utilize engine braking prior to turning or when descending a long downward slope or to obtain adequate accelerating power on an upward slope, while the up-shift switch 40a being operated during D-range driving can be expected to be rare.

Since from this it can be judged that the operation of the down-shift switch 40b during D-range driving is selection of a manual gear-shift mode reflecting the intention of the driver, it follows that maintenance of the manual gear-shift mode (D range paddle shift mode) for a long period is better matched to the driver's intention.

By way of explanation taking as an example a case of the vehicle 14 making a turn as shown in FIG. 3, the reasonable deduction is that the driver's intention in operating the down-shift switch 40b of the paddle shifter 40 is to perform a down-shift (paddle down) before turning and in this condition (down-shifted state) to execute a turning action while depressing the accelerator pedal.

However, should the predetermined time period (timer value) for maintaining the manual gear-shift mode be indiscriminately set at a fixed value as in the prior art, the time period between operation of the down-shift switch 40b and the return to automatic gear-shift mode would be short, and return to automatic gear-shift mode might happen before the turning action of the vehicle 14 begins, in which case control matched to the intention of the driver would be impossible.

Therefore, in order to accurately reflect what is deduced to be the driver's intention regarding a down-shift during D-range driving, the predetermined time period of manual gear-shift mode maintenance is made long in this embodiment.

Moreover, as pointed out above, the up-shift switch 40a is rarely operated during D-range driving, so that occurrence of such an operation is likely to be due to a driver mistake. In this embodiment, therefore, the predetermined time period is set short in such cases in order to quickly return to automatic gear-shift mode, i.e., so as to promptly disable up-shift and ensure adequate acceleration performance.

But since the probability of erroneous operation is low when the driver repeats operation of the paddle shifter 40, manual gear-shift mode is preferably maintained when the driver operates the paddle shifter 40 repeatedly in succession. However, the considerable change in driving condition of the vehicle 14 caused by repeatedly instructing gear-shift action results in a long time being required up to the start of the cruising that is a condition for return to automatic gear-shift mode, so that extension of the predetermined time period for maintaining manual gear-shift mode is liable to produce a result contrary to the intention of the driver. Therefore, when the paddle shifter 40 is repeatedly operated, the predetermined time period is defined as a value equal to or shorter than usual.

Further, owing to the fact that D range paddle shift mode is used mainly in mid-gear range, quick return to automatic gear-shift mode is also adopted in the case of an operation of the paddle shifter 40 during low-gear range or high-gear range driving. As situations in which the paddle shifter 40 is intentionally operated to perform shifting are particularly uncommon in low-gear range, still more rapid return to automatic gear-shift mode is adopted in low-gear range.

Moreover, as performance of a gear-shift action is undesirable during turning of the vehicle 14 as shown in FIG. 3, this embodiment is adapted not to perform a gear-shift action in such a case even if the paddle shifter 40 is operated, and also not to return to automatic gear-shift mode but to maintain the current gear position.

Figure 4:
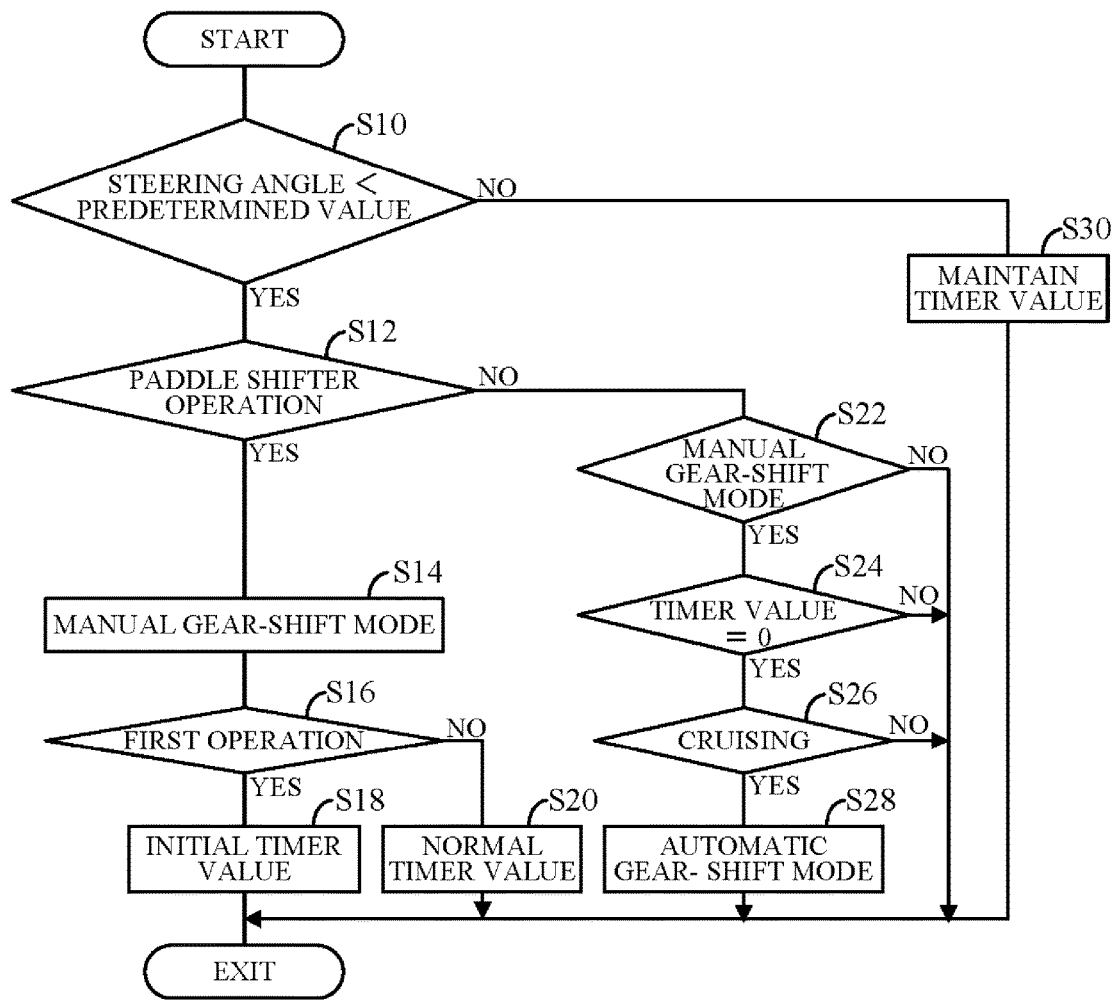
FIG. 4 is a flowchart for explaining operation of the control apparatus for the automatic transmission shown in FIG. 1.

FIG. 4 is a flowchart for explaining operation of the shift controller 60 according to the embodiment of this invention explained above with reference to FIG. 3, and FIG. 5 is an explanatory diagram for explaining a timer value (predetermined time period) indicated in the flowchart of FIG. 4.

Now to explain, in S10, whether steering angle of the steering wheel 36 obtained from the output of the steering angle sensor 56 is less than a predetermined value, i.e., whether the vehicle 14 is turning, is determined (S: processing Step).

When the result in S10 is YES, meaning that the vehicle 14 was determined not to be turning, the program goes to S12, in which whether the paddle shifter 40 (more exactly, either the up-shift switch 40a or the down-shift switch 40b) was operated is determined.

When the result in S12 is also YES, the program goes to S14, in which the gear-shift mode of the paddle shifter 40 is moved to (or maintained in) manual gear-shift mode, and then goes to S16 to determine whether the current cycle paddle shift operation is the first operation after moving to manual gear-shift mode (more exactly, is an operation made during automatic gear-shift mode driving and the operation that prompted the move to manual gear-shift mode).

When the result in S16 is YES, the program goes to S18, in which an initial timer value (explained later) corresponding to the current gear position is selected as the predetermined time period, and when the result in S16 is NO, i.e., when the driver is determined to have input successive shift commands in the current manual gear-shift mode, the program goes to S20, in which a normal timer value (explained later) corresponding to the current gear position is selected (the timer value set earlier is overwritten). As termed here, "predetermined time period" means time period counted before moving (returning) to automatic gear-shift mode, and means the time period following a move to manual gear-shift mode for which manual gear-shift mode is forcibly maintained.

Figure 5:
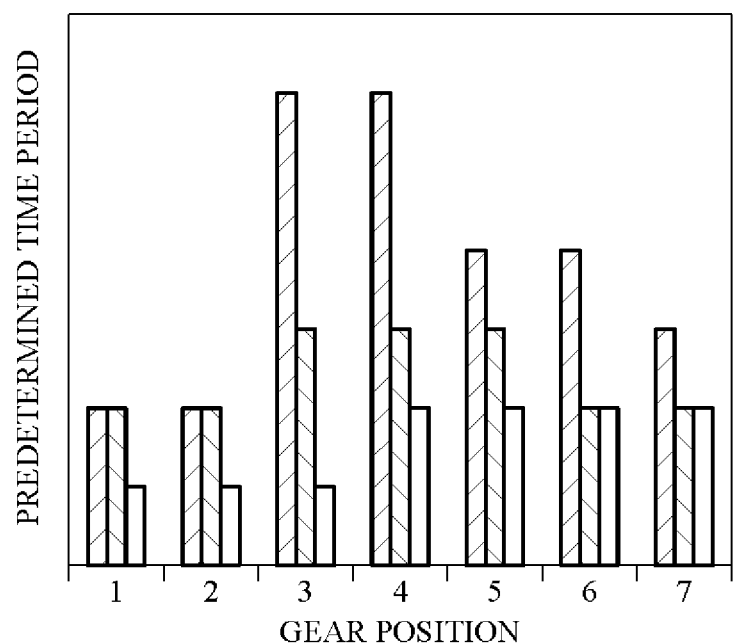
FIG. 5 is an explanatory diagram for explaining a timer value indicated in the flowchart of FIG. 4.

Now follows an explanation with reference to FIG. 5 of initial timer value and normal timer value. In this embodiment of the invention, the value of the predetermined time period that determines return to automatic gear-shift mode is changed between when an up-shift command is input through the up-shift switch 40a and when a down-shift command is input through the down-shift switch 40b, and the value of the predetermined time period concerned is changed between the case of a first operation after moving to manual gear-shift mode and the case of a second or later operation after moving to manual gear-shift mode. A value selected as the predetermined time period in the case of a first operation after moving to manual gear-shift mode is called "initial timer value" and a value selected as the predetermined time period in the case of a second or later operation after moving to manual gear-shift mode is called "normal timer value." In FIG. 5, predetermined time period in the case of a first down-shift command being input (initial down-shift timer value) is indicated by diagonally right up hatching, predetermined time period in the case of a first up-shift command being input (initial up-shift timer value) is indicated by diagonally left up hatching, and normal time value applied at the time of a second or later paddle shift is indicated by no hatching (i.e., the bar graph shown in FIG. 5 indicates from left to right: initial down-shift timer value, initial up-shift timer value, and normal timer value).

Specifically, as regards D range paddle shift mode, when gear position is at or above a first gear position (third gear position in the example of FIG. 5), value of the predetermined time period in the case of a down-shift command being input is set longer than in the case of an up-shift command being input.

The aforesaid D range paddle shift mode is one used mostly in mid-gear range, and when the paddle shifter 40 is operated during driving in low-gear range or high-gear range, the probability of erroneous operation by the driver is high. Therefore, in this embodiment, value of the predetermined time period when gear position is at or higher than a second gear position (fifth gear position in the example of FIG. 5) is set to be equal to or shorter than the predetermined time period when the gear position is at or higher than the first gear position and lower than the second position (third and fourth gear positions in the example of FIG. 5).

A second or later operation of the paddle shifter 40 by the driver, i.e., a repeated shift command input by the driver, can be deduced to more accurately reflect the intention of the driver, but since the time period until the driving condition reaches cruising would become long, the value of the predetermined time period is set short (to be equal to or shorter than in the case of the first operation) in a case where the operation of the paddle shifter 40 is a second or later operation (when the paddle shifter 40 is successively operated). In this embodiment, the timer that counts the predetermined time period is constituted as a down timer.

Returning to explanation with reference to FIG. 4, when the result in S12 is NO, the program goes to S22 to determine whether manual gear-shift mode is currently in progress. When the result in S22 is NO, i.e., when the vehicle 14 is determined to continue to operate in automatic gear-shift mode, the remaining processing steps are skipped and the program terminated.

On the other hand, when the result in S22 is YES, the program goes to S24 to determine whether the value of the time set in S18 or S20 is 0 (whether the predetermined time period has elapsed). When the result in S24 is YES, the program goes to S26 to determine whether the vehicle 14 is currently cruising. The determination of S26 amounts to determining whether no demand from the driver for acceleration or deceleration of the vehicle 14 is present, and, specifically, the vehicle 14 is determined to be cruising when change ΔAP of the accelerator position AP obtained from the output of the accelerator position sensor 58 is equal to or less than a predetermined amount and the brake switch 48 is not outputting an ON signal.

When the result is also YES in S26, the program goes to S28, in which manual gear-shift mode is returned to automatic gear-shift mode. On the other hand, when the result in S24 or S26 is NO, the aforesaid processing is skipped and the program terminated.

Further, when the result in S10 is NO, i.e., when the steering angle of the steering wheel 36 is equal to or greater than the predetermined value and the vehicle 14 is determined to be turning, the program goes to S30, in which the value of the down timer set in S18 or S20 is maintained, i.e., counting by the timer is suspended. And so long as the result in S10 is NO, even if the driver should operate the paddle shifter 40, the shift command (up-shift command or down-shift command) by the operation is rejected (invalidated).

As explained in the foregoing, an apparatus for controlling an automatic transmission 30 (shift mechanism 26 and forward/reverse changeover mechanism 28) configured to change speed of driving rotation of an engine (power source; internal combustion engine) 10 installed in the vehicle 14 and transmits it to the output shaft (transmission output shaft) 42, includes the up-shift instructing unit (e.g., the up-shift switch 40a) operated by the driver of the vehicle 14 to output an up-shift command for the gear position of the automatic transmission 30, the down-shift instructing unit (e.g., the down-shift switch 40b) provided apart from the up-shift switch 40a as a separate component operated by the driver of the vehicle 14 to output a down-shift command for the gear position of the automatic transmission 30, the mode switching unit configured to switch the gear shift mode between the automatic gear-shift mode that automatically selects the gear position 30 based on the driving condition of the vehicle 14, and the manual gear-shift mode that selects the gear position 30 based on the output of the up-shift switch 40a or the down-shift switch 40b, and the mode maintaining unit 62 configured to maintain the manual gear-shift mode for the predetermined time period when the up-shift switch 40a or down-shift switch 40b is operated by the driver. The mode maintaining unit sets the predetermined time period (initial up-shift timer value) when the up-shift switch 40a is operated, to be shorter than the predetermined time period (initial down-shift timer value) when the down-shift switch 40b is operated, when the gear position 30 is at or higher than the predetermined gear position (e.g., third gear position) (e.g., S18). Therefore, return to automatic gear-shift mode can be decided in accordance with circumstances deduced as manual shifting intention of the driver, thereby enhancing convenience of the automatic transmission 30.

Generally speaking, circumstances in which a driver is deduced to desire gear shifting in manual gear-shift mode are cases such as when utilizing engine braking or when accelerating power is desired, so that a down-shift command through the down-shift command switch 40b can be considered to accurately reflect the driver's intention to shift gears, while the probability that an up-shift command through the up-shift command switch 40a is due to a driver mistake is high. Therefore, in the control apparatus for an automatic transmission according to this embodiment of the invention, the time period of maintaining the manual gear-shift mode (predetermined time period) is set shorter when the up-shift command switch 40a is operated than when the down-shift command switch 40b is operated, thereby enabling quicker return from manual gear-shift mode to automatic gear-shift mode.

Moreover, the mode maintaining unit is configured to set the predetermined time period when the gear position is lower than the first gear position, to be equal to or shorter than the predetermined time period when the gear position is at or higher than the first gear position (S18), i.e., to change the predetermined time period in accordance with gear position, so that in addition to realizing the aforesaid effects, the manual shifting intention of the driver can be still more accurately reflected and convenience of the automatic transmission 30 further enhanced.

Further, the mode maintaining unit is configured to set the predetermined time period when the gear position is at or higher than a second position (e.g., fifth hear position) higher than the first gear position, to be equal to or shorter than the predetermined time period when the gear position is at or higher than the predetermined gear position and lower than the second position (S18), so that in addition to realizing the aforesaid effects, the manual shifting intention of the driver can be still more accurately reflected and convenience of the automatic transmission 30 further enhanced.

In addition, the mode maintaining unit is configured to change the predetermined time period to be equal to or shorter than the predetermined time period set when the up-shift command switch 40a or the down-shift command 40b is first operated by the driver in the manual gear-shift mode, when operation of the up-shift command switch 40a or the down-shift command switch 40b is repeated by the driver, i.e., the predetermined time period is set to be shorter upon a repeated shift command from the driver (S16, S20), so that in addition to realizing the aforesaid effects, the manual shifting intention of the driver can be still more accurately reflected and convenience of the automatic transmission 30 further enhanced.

Moreover, steering angle detecting unit (the steering angle sensor 56) is provided for detecting steering angle of the steering wheel 36 of the vehicle, and the mode maintaining unit is configured to pause counting of the predetermined time period while the detected steering angle is equal to or greater than a predetermined value (S10, S30), so that in addition to realizing the aforesaid effects, return to automatic gear-shift mode can be avoided during vehicle 14 turning, thereby further enhancing convenience of the automatic transmission 30.

Further, a configuration is adopted whereby the up-shift command switch 40a and the down-shift command switch 40b are provided on the back surface of the steering wheel 36 of the vehicle 14, so that in addition to realizing the aforesaid effects, the manual shifting intention of the driver can be still more accurately reflected and convenience of the automatic transmission 30 further enhanced even in driver mistake-conducive situations.

The automatic transmission 30 is not limited by type to a stepped transmission can instead be a continuously variable transmission.

Although the engine 10 was exemplified as the power source, this is not a limitation, and it is alternatively possible, for example, to adopt an arrangement that utilizes the engine 10 together with motors for driving, in the manner of a hybrid vehicle.

REFERENCE SIGNS LIST

10 engine (internal combustion engine; power source), 12 drive wheel, 14 vehicle, 26 shift mechanism (automatic transmission), 28 forward/reverse changeover mechanism (automatic transmission), 30 automatic transmission, 34 select lever, 36 steering wheel, 40 paddle shifter, 40a up-shift switch 40a (up-shift instructing unit), 40b down-shift switch (down-shift instructing unit), 42 transmission output shaft (output shaft), 56 steering angle sensor, 60 shift controller (control apparatus for automatic transmission)

The invention claimed is:

1. An apparatus for controlling an automatic transmission configured to change speed of driving rotation of a power source mounted on a vehicle and transmit the speed of driving rotation to an output shaft of the transmission, comprising:

an up-shift instructing unit configured to be operated by a driver of the vehicle to output an up-shift command for a gear position of the transmission;

a down-shift instructing unit separated from the up-shift instructing unit and configured to be operated by the driver to output a down-shift command for the gear position of the transmission;

a mode switching unit configured to switch a gear-shift mode between an automatic gear-shift mode for automatically selecting the gear position based on a driving condition of the vehicle and a manual gear-shift mode for selecting the gear position based on an output of the up-shift instructing unit or the down-shift instructing unit; and a mode maintaining unit configured to maintain the manual gear-shift mode for a predetermined time period when the up-shift instructing unit or the down-shift instructing unit is operated by the driver,
wherein the mode maintaining unit sets the predetermined time period when the up-shift instructing unit is operated, to be shorter than the predetermined time period when the down-shift instructing unit is operated, when the gear position is at or higher than a first gear position, and
the mode maintaining unit sets the predetermined time period when the up-shift instructing unit or the down-shift instructing unit is operated in a case that the gear position is at or higher than a second gear position higher than the first gear position, to be equal to or shorter than the predetermined time period when the up-shift instructing unit or the down-shift instructing unit is operated in the case that the gear position is at or higher than the first gear position and lower than the second gear position.

2. The apparatus according to claim 1, wherein the mode maintaining unit sets the predetermined time period when the up-shift instructing unit or the down-shift instructing unit is operated in a case that the gear position is lower than the first gear position, to be equal to or shorter than the predetermined time period when the up-shift instructing unit or the down-shift instructing unit is operated in a case that the gear position is equal to or higher than the first gear position.

3. The apparatus according to claim 1, wherein the mode maintaining unit changes the predetermined time period to be equal to or shorter than the predetermined time period set when the up-shift instructing unit or the down-shift instructing unit is operated by the driver for the first time in the manual gear-shift mode, when operation of the up-shift instructing unit or the down-shift instructing unit is repeated by the driver.

4. The apparatus according to claim 1, further comprising:
a steering angle detecting unit configured to detect a steering angle of a steering wheel operated by the driver,
wherein the mode maintaining unit stops counting of the predetermined time period when the up-shift instructing unit or the down-shift instructing unit is operated while the steering angle detected by the steering angle detecting unit is equal to or greater than a predetermined value.

5. The apparatus according to claim 1, wherein the up-shift instructing unit and the down-shift instructing unit are provided on a back surface of a steering wheel operated by the driver.

6. The apparatus according to claim 1, further comprising:
an acceleration/deceleration demand outputting unit configured to output a demand for acceleration or deceleration of the vehicle based on an operation by the driver,
wherein the mode maintaining unit prohibits switching from the manual gear-shift mode to the automatic gear-shift mode by the mode switching unit when the demand for acceleration or deceleration is outputted by the acceleration/deceleration demand outputting unit.

* * * * *